J. BELOU.
Car-Truck.

No. 207,480. Patented Aug. 27, 1878.

UNITED STATES PATENT OFFICE.

JACQUES BELOU, OF PARIS, FRANCE.

IMPROVEMENT IN CAR-TRUCKS.

Specification forming part of Letters Patent No. 207,480, dated August 27, 1878; application filed April 10, 1878; patented in France, February 5, 1877.

*To all whom it may concern:*

Be it known that I, JACQUES BELOU, of the city of Paris, in France, have invented a new and useful Improvement in Anti-Friction Gears for Axles, which improvement is fully set forth in the following specification.

This invention relates to certain improvements in anti-friction gear for vehicles, its object being to so arrange the friction-rollers thereof that they may move independently of each other, to adapt them to the unequal revolutions of the axle-shaft.

The invention further has for its object to provide an elastic support for the friction-rollers, whereby they are kept constantly in contact with the axle or shaft, as more fully hereinafter set forth.

To this end the invention consists, first, in the combination, with the axle or shaft of a vehicle, of two rollers mounted upon a divided shaft, the ends of which are secured together by means of a collar or sleeve in such manner that the rollers may be rotated independently of each other, as more fully hereinafter specified; second, in the combination, with the friction-rollers and their supports, of a horizontal arm riding on a downwardly-projecting rod secured to the truck or frame of the vehicle, as more fully hereinafter set forth.

Figure 1:
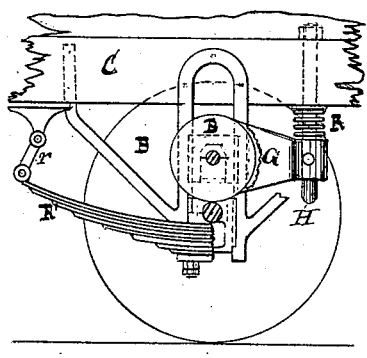
Figure 2:
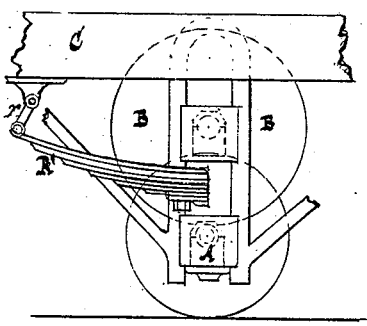
Figure 3:
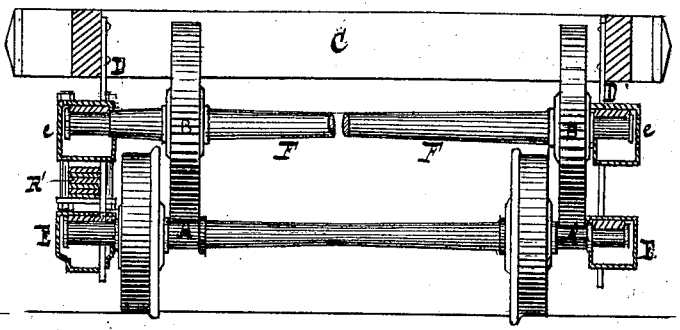
Figure 5:
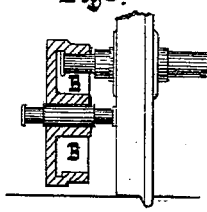
Figure 4:
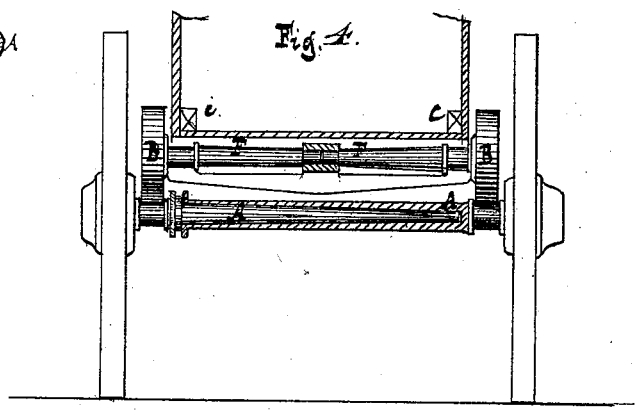

In the drawings, Figure 1 represents a side elevation of a portion of a car, showing my improvement. Fig. 2 represents a side elevation of a modification of my invention. Fig. 3 represents an end view of the same. Fig. 4 represents a sectional view, showing my improved axle; and Fig. 5 represents a detached view of a modification of the friction-rollers.

The letter A represents the axle of the vehicle, which may be of the ordinary construction, or, as shown in Fig. 4, in two parts, one part consisting of a tapering cylindrical bar and the other of a hollow sleeve, which fits upon and is capable of turning on the tapering bar, so as to allow the wheels to rotate together or independently of each other. The shaft or axle may be journaled at its ends in boxes, as shown in Figs. 1, 2, 3, or the wheels may be secured to the ends of the axle and the journals may be made at intermediate points, as shown in Fig. 4.

The letter B represents the friction-rollers, which are mounted upon a shaft, F, which is divided at its center; the two parts being united by means of a sleeve or collar, so that they may rotate independently of each other. The said shaft F is mounted in boxes e above the axle or shaft of the vehicle in such position that the rollers will bear against the axle and support the same.

The letter G represents an arm extending backwardly from the boxes in which the roller-shaft is journaled, its extremity being bored perpendicularly and fitted upon a bar, H, upon which it rides, a spring, R, being interposed between it and the truck in order to keep the wheels in contact with the axle or shaft during the jars or concussions to which the vehicle is liable.

The letter R' represents the springs upon which the truck is mounted, which are secured to the said truck by connecting-links r, and to the journal-guides by means of bolts or their equivalents.

In the modification shown in Fig. 5 the friction-rollers are formed with an annular recess, which sits over the end of the axle or shaft A instead of having its periphery in contact with said axle.

The letter D represents the axle-guard of the shaft A and of the shaft or axle of the wheels B.

It will be perceived that, as constructed, both the rollers and the wheels are capable of independent movement upon their respective shafts, whereby provision is made for any irregularities of revolution of the wheels.

What I claim is—

1. In combination with the axle of a vehicle, the friction-pulleys mounted upon a divided shaft, the ends of which are secured together by means of a collar or sleeve, in such manner that the rollers may be rotated independently of each other, substantially as and for the purposes set forth.

2. In combination with the friction-rollers and their supports, the horizontal arms, riding on downwardly-projecting rods secured to the truck-frame, and the spiral springs located between said arms and the truck, substantially as and for the purposes specified.

J. BELOU.

Witnesses:
H. BONNEVILLE,
W. H. DAUBENY.